United States Patent [19]

Kato

[11] Patent Number: 4,638,365
[45] Date of Patent: Jan. 20, 1987

[54] IMAGE SENSING DEVICE
[75] Inventor: Tokuzo Kato, Chiba, Japan
[73] Assignee: Canon Kabushiki Kaisha, Tokyo, Japan
[21] Appl. No.: 693,559
[22] Filed: Jan. 22, 1985
[30] Foreign Application Priority Data
 Jan. 31, 1984 [JP] Japan ................................. 59-15819
[51] Int. Cl.⁴ ............................................. H04N 5/26
[52] U.S. Cl. .................................... 358/228; 354/429
[58] Field of Search ............... 358/211, 213, 219, 228; 354/429, 460

[56] References Cited
U.S. PATENT DOCUMENTS

| 4,365,272 | 12/1982 | Nagai | 358/228 |
|---|---|---|---|
| 4,396,951 | 8/1983 | Tanaka | 358/228 |
| 4,409,472 | 10/1983 | Kimura | 358/228 |
| 4,410,915 | 10/1983 | Yamamoto | 358/228 |
| 4,427,996 | 1/1984 | Tamura | 358/228 |
| 4,471,383 | 9/1984 | Shiono | 358/228 |
| 4,473,843 | 9/1984 | Bishop | 358/228 |
| 4,532,553 | 7/1985 | Brill | 358/228 |
| 4,542,403 | 9/1985 | Zimmerman | 358/228 |

Primary Examiner—Gene Z. Rubinson
Assistant Examiner—L. C. Schroeder
Attorney, Agent, or Firm—Toren, McGeady & Goldberg

[57] ABSTRACT

An image sensing device comprises a stop to control the quantity of light coming from an object to be photographed; an image sensor; an automatic light quantity control system to control the stop according to a signal produced from the image sensor; a gain control circuit to control the gain of the signal produced from the image sensor; an operation member provided for manually operating the stop; and a memory to stabilize the gain of the gain control circuit in response to the operation member when the member is operated.

31 Claims, 5 Drawing Figures

IMAGE SENSING DEVICE

BACKGROUND OF THE INVENTION

1. Field of the Invention

This invention relates to an image sensing device of a video camera having an automatic gain control circuit and more particularly to an image sensing device which is provided with automatic and manual aperture control devices and which has an improved manual aperture control characteristic.

2. Description of the Prior Art

A video camera includes a lens system which converges light information coming from an object to be photographed; an image sensor which is disposed in a position where an image of the object is formed and converts the light information into an electrical signal; an image circuit which processes a picture signal from the image sensor; a sound circuit; a color modulation output circuit; and others. An automatic light quantity control system is generally arranged within the video camera to automatically adjust a stop aperture so that picture-taking can be promptly started just by directing the camera to an object. Furthermore, in addition to the automatic light control system, a manual aperture control device is provided to permit the photographer to take a picture with some desired effect that is not obtainable by automatic aperture control. Therefore, the photographer can select either automatic aperture control or manual aperture control by operating a switchover device.

Meanwhile, the automatic gain control system, which is connected to the rear stage of the automatic light quantity control system, controls the level of the picture signal so it does not vary when a quantity of light which is out of a light quantity range controllable by the automatic light quantity control system comes through the lens system. Therefore, when the photographer manually sets a desired aperture value by selecting a manual aperture control mode, the automatic gain control system prevents the picture signal level from becoming a desired level, corresponding to the manually set aperture value.

The following description covers details with reference to FIG. 1 of the accompanying drawings: A lens 1 converges light. A stop device 2 includes an automatic aperture control arrangement, a manual aperture control arrangement and a selection arrangement which permit selection of manual and automatic aperture control modes. An image sensor 3 converts a light signal into an electrical signal. A preamplifier 4 amplifies a picture signal obtained from the image sensor 3. A signal processing circuit 5 performs blanking mixing, gamma correction, etc. on a signal produced from the pre-amplifier 4. A gain control amplifier circuit 6 keeps a signal produced from the signal processing circuit 5 at a predetermined level. An integration circuit 7 converts a signal produced from the gain control amplifier circuit 6 into a DC voltage. The DC voltage thus produced from the integration circuit 7 is used as the control signal for the gain control amplifier circuit 6 for gain control. The circuits 6 and 7 thus form a closed loop which serves as an automatic gain control system. A luminance signal separation circuit 8 separates a luminance signal component from a picture signal produced by the gain control amplifier circuit 6. A chrominance signal separation circuit 9 separates a chroma signal component from the picture signal.

An integration circuit 10 converts a signal produced from the pre-amplifier 4 into a DC voltage. A comparator 11 has an inversion input terminal thereof connected to a reference voltage source 12 and has the DC voltage from the integration circuit 10 applied to its non-inversion input terminal. An aperture control amplifier 13 receives from the comparator 11 a deviation voltage resulting from comparison of the output of the integration circuit 10 and the output of the reference voltage source 12. The amplifier 13 then amplifies an aperture control signal corresponding to the deviation voltage. The output voltage of the amplifier 13 is applied to the stop device 2 for automatic aperture control. A negative feedback loop is thus formed by the stop device 2, the image sensor 3, the pre-amplifier 4, the integration circuit 10, the comparator 11 and the aperture control amplifier 13. The negative feedback loop is called an automatic light quantity control system (or an ALC for short), which controls the aperture of the automatic stop device 2 in such a way as to keep the output of the pre-amplifier 4 from varying.

The prior art device arranged as shown in FIG. 1 operates as follows: The light information on the object which has passed through the lens 1 is adjusted to a suitable light quantity by the stop device 2. The quantity of adjusted light information is then imaged on the image sensor 3. The image sensor 3 then produces a picture signal, which is supplied to the pre-amplifier 4. Upon receipt of the picture signal, the pre-amplifier 4 amplifies the weak picture signal. The output of the pre-amplifier 4 is supplied to the signal processing circuit 5 and also to the integration circuit 10. The signal processing circuit 5 then performs gamma correction on the output of the preamplifier 4 to correct and adjust the overall characteristic of the whole image sensing device to the gamma characteristic of a display device (not shown). Furthermore, the circuit 5 adds blanking pulses to the picture signal from the image sensor 3 and performs a wave form clipping process on the picture signal. The output of the signal processing circuit 5 is supplied to the gain control amplifier circuit 6. A part of the output signal of the gain control amplifier circuit 6 is applied to the integration circuit 7 to be converted into a DC voltage. The DC voltage thus obtained is fed back to the gain control amplifier circuit 6 to keep the output signal of the circuit 6 at a constant level. The picture signal, which is thus controlled at a constant level, is then supplied to the luminance signal component separation circuit 8 and the chrominance signal component separation circuit 9 respectively.

Meanwhile, with the output signal of the preamplifier 4 applied to the integration circuit 10, the circuit 10 converts it into a DC voltage. The DC voltage is applied to the non-inversion input terminal of the comparator 11. The comparator 11 compares the DC voltage with a reference voltage received from the reference voltage source 12. A deviation voltage which results from the comparison is applied to the aperture control amplifier circuit 13. The amplifier 13 then amplifies the deviation voltage and applies it to the stop device 2 for aperture control.

The image sensing device which is arranged in this manner thus controls the stop device 2 by the above-stated automatic light quantity control system in such a way as to keep the output of the pre-amplifier 4 at a constant level. In the event that the light quantity control becomes impossible by the automatic light quantity control system ALC due to a great increase or decrease in the light quantity of the light information on the object, the automatic gain control system which is disposed in the rear stage of the image sensing device performs control in such a way as to keep the output of the gain control amplifier 6 at a constant level. The automatic gain control system thus performs complementary control in place of the automatic light quantity control system ALC of the front stage of the image sensing device.

However, when the image sensing device which is arranged in this manner is to be used in a manual aperture control mode by switching the automatic aperture control mode to the manual aperture control mode, the above automatic gain control system which consists of the gain control amplifier circuit 6 and the integration circuit 7 operates to keep the picture signal at a predetermined level even when the aperture is manually opened or stopped down in an attempt to brighten or darken the picture. In the event of a back-light shot, for example, when the device is set in the manual aperture control mode, a large quantity of light incident on the device operates the automatic gain control system to hinder the desired effect from being attained, as expected from the manual aperture control. This has been a drawback of the prior art device.

It is therefore a general object of this invention to eliminate the above-stated drawback of the prior art device.

It is a more specific object of this invention to provide an image sensing device of the kind having an automatic gain control system and an automatic/manual aperture control selecting arrangement, wherein, when the device is shifted from an automatic aperture control mode to a manual aperture control mode, the brightness level of the picture is freely adjustable by adjusting the manual aperture control.

The above and further objects and features of the invention will become apparent from the following detailed description of preferred embodiments thereof taken in conjunction with the accompanying drawings.

SUMMARY OF THE INVENTION

An image sensing device includes an image sensing means for sensing an optical image, exposure control means for controlling light incident on the image sensing means, gain control means for automatically controlling the gain of a signal produced from the image sensing means, an operation member for a manual operation on the aperture of the exposure control means, and memory means for holding the gain of the gain control means in response to the operation of the operation member.

DETAILED DESCRIPTION OF THE PREFERRED EMBODIMENTS

Figure 2:
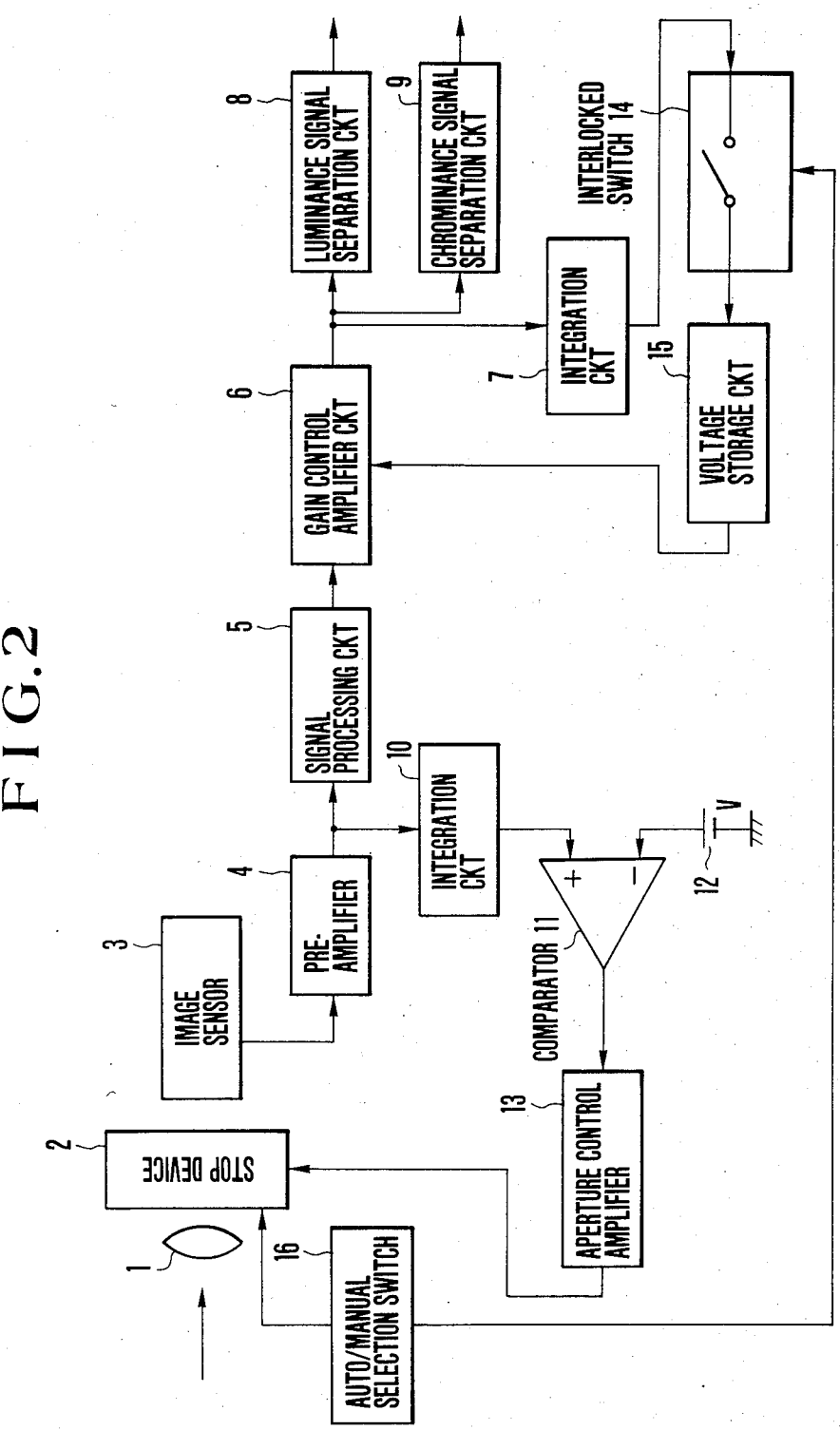
FIG. 2 is a circuit diagram showing an embodiment of this invention.
Figure 3:
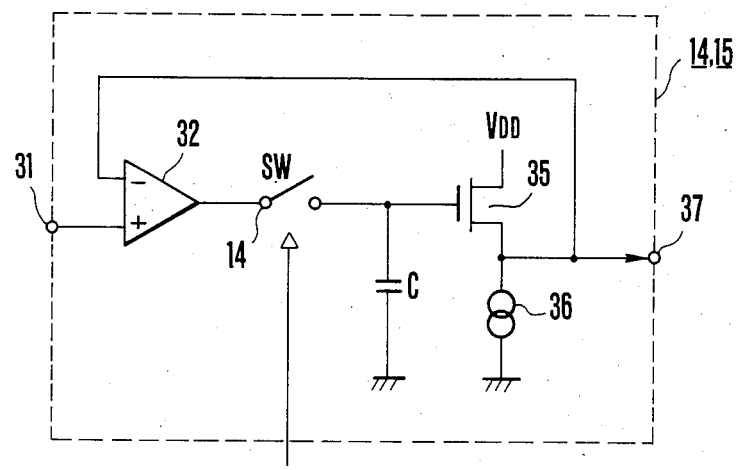
FIG. 3 is a circuit diagram showing an analog type voltage storage circuit employed in the embodiment.
Figure 4:
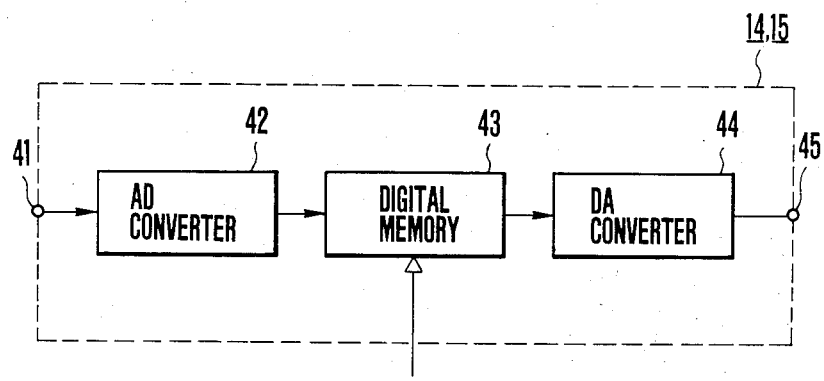
FIG. 4 is a block diagram showing a digital voltage storage circuit employed in the embodiment.
Figure 5:
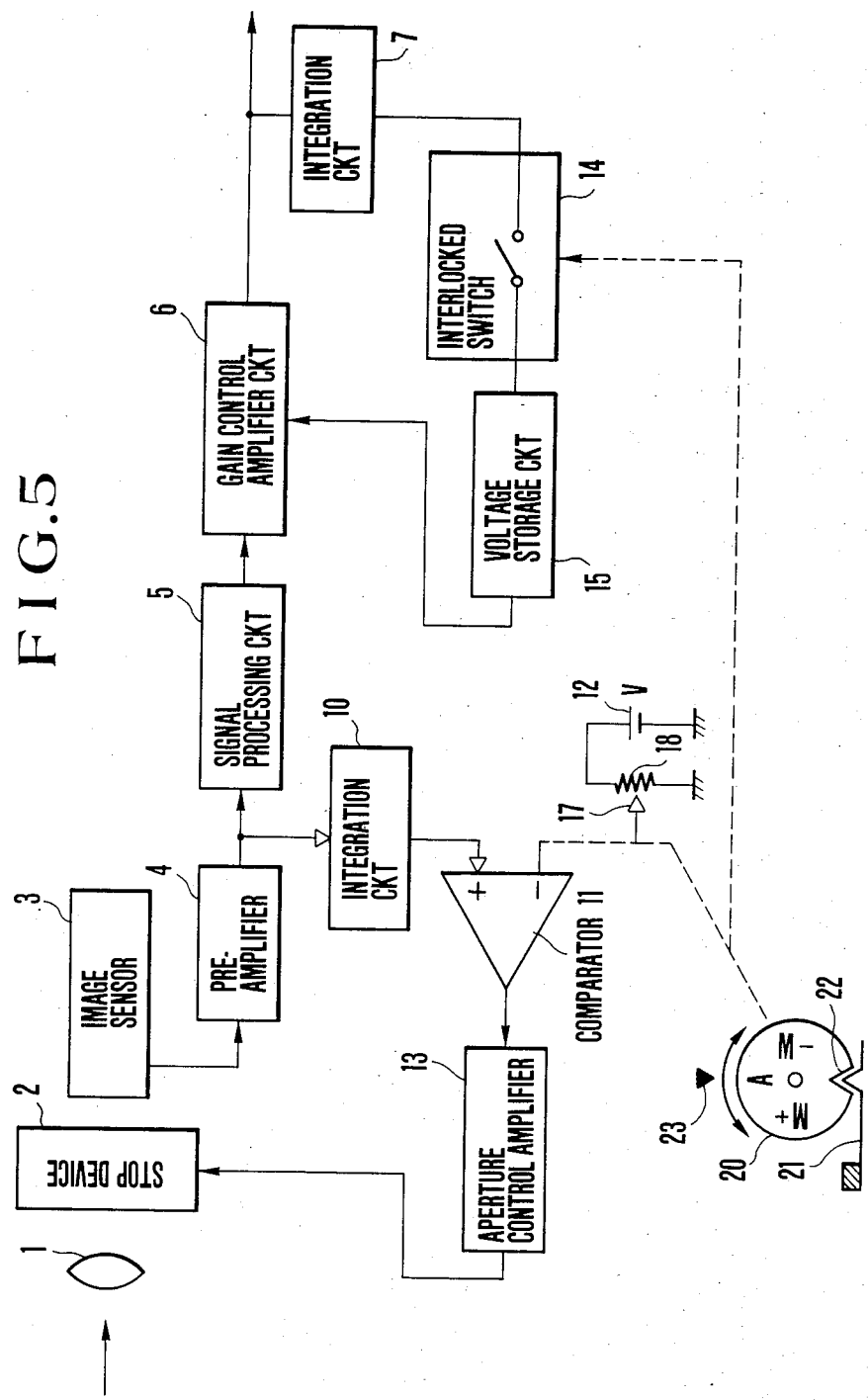
FIG. 5 is a block diagram showing another embodiment of this invention.

The following description shows an arrangement in accordance with this invention to attain the above-stated objects with reference to the accompanying drawings, in which: FIG. 2 shows an example of one embodiment of the invention. FIG. 3 shows, by way of example, an analog voltage storage circuit usable for the same embodiment. FIG. 4 shows, also by way of example, a digital voltage storage circuit usable for the same embodiment. FIG. 5 shows another example of an embodiment of the invention.

Figure 1:
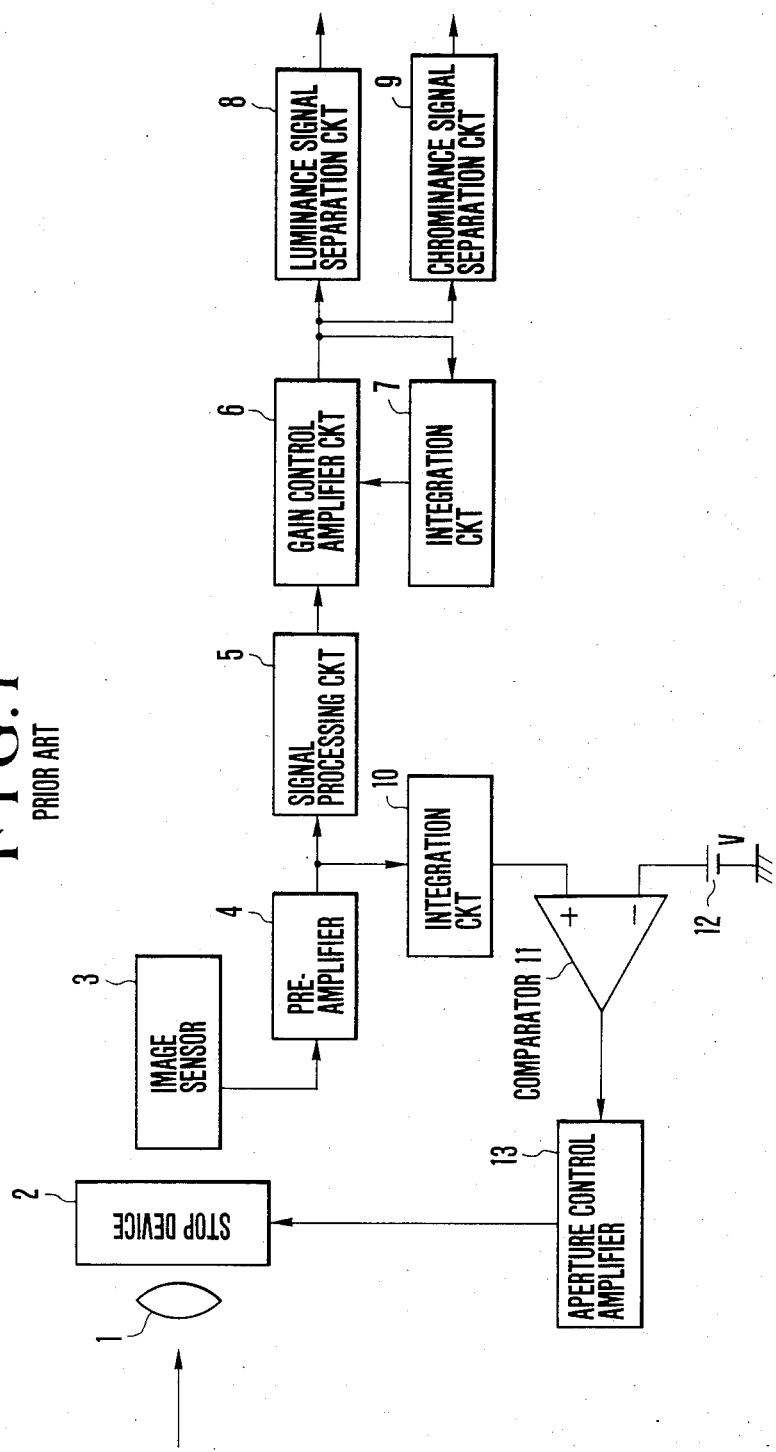
FIG. 1 is a block diagram showing the conventional image sensing device. Drawings from FIG. 2 through FIG. 5 show image sensing devices according to this invention. Of these drawings.

Referring to FIG. 2, the circuit elements 1 through 13 are arranged and function in the same manner as those indicated by the same reference numerals as those in FIG. 1 and, therefore, do not require further description here. The embodiment is provided with an automatic/manual selection switch 16 which is at the stop device 2 to permit selection of manual operation or to serve as correcting means. An interlocking switch 14 closes when the automatic/manual selection switch 16 is set at an automatic aperture control position and opens when the selection switch 16 is set at a manual aperture control position. A voltage storage circuit 15, which serves as fixing means or memory means, applies a DC voltage from the integration circuit 7 to the gain control amplifier circuit 6 when the interlocking switch 14 is closed and thus forms an automatic gain control system. The automatic gain control system stabilizes the output level of the gain control amplifier circuit 6 and stores the DC voltage produced from the integration circuit 7 immediately before switch-over between an automatic aperture control mode and a manual aperture control mode when the interlocking switch 14 is opened. This stored voltage is applfied to the gain control amplifier circuit 6 keeping the gain thereof stable and keeping the output level of the gain control amplifier circuit 6 at a constant level.

With the automatic/manual selection switch 16 shifting to the manual position, the stop device 2 is set into a manual aperture control mode to permit manual setting of the aperture thereof at a desired aperture value. The interlocking switch 14 opens the instant the automatic/manual selection switch 16 is shifted to the manual position. Then, the voltage storage circuit 15 stores and holds the DC voltage from the integration circuit 7 obtained immediately before the position of the interlocking switch 14 switches.

Referring to FIG. 3, the analog type voltage storage circuit is arranged as follows: The DC voltage from the integration circuit 7 is supplied to an input terminal 31. The analog storage circuit comprises a differential amplifier 32; the above-stated interlocking switch 14; a capacitor C which stores and holds the output voltage of the differential amplifier 32; a MOSFET 35; a current source; and an output terminal 37 for applying the voltage held at the gain control circuit 6. Part of the output from the output terminal 37 is fed back to the differential amplifier 32. With the interlocking switch 14 closed, the DC voltage from the integration circuit 7 is applied via the input terminal 31 to the non-inversion input terminal of the differential amplifier 32. The output of the differential amplifier 32 is supplied via the interlocking switch 14 to the gate of the MOSFET 35 after it has been stored and held at the capacitor C. The output of the MOSFET 35 is supplied via the output terminal 37 to the gain control amplifier circuit 6. Meanwhile, part of the output of the MOSFET 35 is fully fed back to the inversion input terminal of the differential amplifier 32.

Again referring to FIG. 2, when the interlocking switch 14 opens, the DC voltage obtained from the integration circuit 7 immediately before the position of the interlocking switch 14 is shifted is stored and held at the capacitor C of FIG. 3. The stored voltage then flows as a leak current via the gate of the MOSFET 35. However, since the value of this leak current is very small, the voltage with which the capacitor C is charged is held over a long period of time. After that, the stored voltage is applied from the output terminal 37 to the gain control amplifier circuit 6 to keep the gain of the circuit 6 at a constant value.

Therefore, even when the photographer adjusts the aperture a desired value by setting the stop device 2 into the manual aperture control mode, the brightness of a picture can be adjusted as desired without hindrance by the automatic gain control system.

Referring now to FIG. 4, the digital voltage storage circuit is arranged as follows: The digital voltage storage circuit is provided with an input terminal 41 which receives the DC voltage from the integration circuit 7; an AD converter 42; and a digital voltage storage 43 which is composed of a semiconductor memory. The digital voltage storage 43 stores digital signals coming from the AD converter 42, one after another, and produces signals one after another, to a DA converter 44 which is disposed at a stage ensuing the storage 43. When the automatic/manual selection switch 16 is shifted to the manual aperture control position, an instruction signal is supplied to the storage 43. Then, in response to this signal, a DC voltage which is received and converted into a digital signal when the instruction signal is received is stored by the storage 43. This stored signal is then converted by the DA converter 44 into an analog signal. The analog signal thus obtained is applied via an output terminal 45 to the gain control amplifier circuit 6 to keep the gain of the gain control amplifier circuit 6 at a constant value.

A modification of the embodiment of this invention, which is shown in FIG. 2, is arranged as shown in FIG. 5. In FIG. 5, the circuit elements which are indicated by the same reference numerals as those corresponding parts of FIG. 2 are arranged and function in the same manner as described above and therefore require no further description.

The modification includes a resistor 18 which is connected between the reference voltage source 12 and a circuit ground. A slider 17 which slides over the resistor 18 is connected to the non-inversion input terminal of the comparator 11. The slider 17 has its position shifted based on the degree to which a dial 20, which will be described later, is turned. In the automatic aperture control mode, the slider 17 is fixed in a predetermined position; the automatic light quantity control system ALC operates amplifying the deviation voltage from the comparator 11 by the aperture control amplifier 13 in such a way as to keep the output of the pre-amplifier 4 at a constant level; and the amplified deviation voltage is applied to the stop device 2 to carry out automatic aperture control in the same manner as has been described in the foregoing with reference to FIG. 2. The modification further includes the operation dial 20 which serves as operation means or correction means; a click spring 21 which engages a groove 22 provided in the dial 20; and an index 23. The automatic aperture control mode is selected when a mark "A" is adjusted to the index 23. The aperture can be manually opened when a part marked "M+" of the dial 20 is set at the index 23 and manually stopped down when a part marked "M−" of the dial 20 is set at the index 23. The parts "M+" and "M−" are provided for the purpose of manually adjusting an exposure or an exposure for a back-light shot. In obtaining the manual aperture control mode, the operation dial 20, which is disposed on the outside of the image sensing device, moves the slider 17 by releasing, through the click spring 21, the slider 17 from the above locked and fixed condition in the predetermined position. Following the release of the operation dial 20, the interlocking switch 14 is opened. The DC voltage, which is obtained from the integration circuit 7 at the time when the position of the interlocking switch 14 is shifted, is stored. Then, the gain of the gain control amplifier circuit 6 is kept stable with the stored DC voltage applied to the circuit 6. The value of the deviation voltage from the comparator 11 is changed by adjusting the position of the slider 17 relative to the resistor 18. The deviation voltage is then amplified by the aperture control amplifier 13. The amplified voltage thus obtained is applied to the automatic aperture control arrangement provided within the stop device 2 to change the aperture of the automatic stop device 2. The level of the picture signal from the pre-amplifier 4 thus can be controlled by adjusting the position of the slider 17 in this manner.

The arrangement of the embodiment described above is of course applicable to any of image sensing devices of single-tube, two-tube and three-tube types and also to an image sensing device using a solid-state image sensor.

In accordance with this invention, as described in the foregoing, the gain of the automatic gain control system is arranged to be fixed and unvarying when the image sensing device is shifted from an automatic aperture control mode to a manual aperture control mode. In the manual aperture control mode, therefore, the aperture can be manually adjusted as desired and the brightness level of the image can be changed as desired without any restriction by the automatic gain control system, so that the manual aperture control can be fully effected on the image sensing device.

In the embodiment described, the control operations of the exposure control system and the gain control system are performed by feeding back the signal level of the image sensing means respectively. However, it is also possible to include some additional control means for stabilizing the signal level through feedback control. In that instant, while at least one feedback control system is being corrected by some operation means or the like, the control states of other feedback control systems must be fixed and kept unvarying.

Further, in the embodiment given, the gain control system is arranged to be fixed when the exposure control system is corrected. However, this arrangement may be conversely made to fix the exposure control system when the gain control system is corrected.

What is claimed is:
1. An image sensing device comprising:
   (a) image sensing means for sensing an optical image;
   (b) exposure control means for controlling light incident on said image sensing means;
   (c) gain control means for automatically controlling the gain of a signal produced from said image sensing means;
   (d) an operation member for a manual operation on said exposure control means; and

(e) memory means for holding the gain of said gain control means when the operation member operates.

2. An image sensing device according to claim, 1 wherein said exposure control means includes an aperture.

3. A device according to claim 1, further comprising control means for controlling the operation of said exposure control means according to the output of said image sensing means.

4. A device according to claim 1, wherein said gain control means includes a variable gain amplifier.

5. A device according to claim 1, wherein said memory means includes a capacitor.

6. A device according to claim 1, wherein said memory means includes a semiconductor memory.

7. A device according to claim 1, wherein said operation member is provided for the purpose of carrying out correction for a back-light shot.

8. A device according to claim 1, wherein said operation member is provided for exposure correction.

9. An image sensing device comprising:
(a) image sensing means for sensing an optical image;
(b) exposure control means for controlling light incident on said image sensing means according to the output of said image sensing means;
(c) gain control means for automatically controlling the gain of a signal produced from said image sensing means;
(d) correction means for correcting control performed by said exposure control means; and
(e) memory means for holding the gain of said gain control means while said correction means is in operation.

10. A device according to claim 9, wherein said exposure control means includes an aperture stop.

11. A device according to claim 9, wherein said gain control means includes a variable gain amplifier.

12. A device according to claim 9, wherein said memory means includes a capacitor.

13. A device according to claim 9, wherein said memory means includes a semiconductor memory.

14. A device according to claim 9, wherein said correction means is provided for the purpose of carrying out correction for a back-light shot.

15. A device according to claim 9, further comprising operation means for a manual operation on said correction means.

16. An image sensing device comprising:
(a) image sensing means for sensing an optical image;
(b) exposure control means for controlling light incident on said image sensing means according to the output of said image sensing means;
(c) gain control means for controlling the gain of the output signal of said image sensing means according to the output of said image sensing means;
(d) correction means for correcting the controlling state of either said exposure control means or said gain control means; and
(e) fixing means for fixing the controlling state of either said exposure control means of said gain control means while said correction means is performing a correcting operation.

17. A device according to claim 16, wherein said fixing means includes memory means for holding said controlling state.

18. A device according to claim 17, wherein said memory means includes a capacitor.

19. A device according to claim 17, wherein said memory means includes a semiconductor memory.

20. An image sensing device comprising:
(a) image sensing means for sensing an optical image;
(b) a plurality of control means performing feedback control for keeping the level of a signal produced by said image sensing means unvarying;
(c) correction means for correcting the operating state of at least one of said plurality of feedback control means in response to manual operation; and
(d) fixing means for fixing the controlling operations of other control means while said correction means is operating on one of said plurality of control means.

21. A device according to claim 20, wherein said plurality of control means include exposure control means for controlling light incident on said image sensing means.

22. A device according to claim 20, wherein said plurality of control means include gain control means for controlling the gain of a signal produced from said image means.

23. A device according to claim 20, wherein said correction means is arranged to permit a manual correcting operation at least on one of said plurality of control means.

24. A device according to claim 20, wherein said fixing means includes memory means for holding said controlling state.

25. An image pick-up apparatus comprising:
(a) image sensing means for sensing an optical image;
(b) exposure control means for controlling said optical image incident on said image sensing means;
(c) gain control means for controlling the gain of a signal produced from said image sensing means;
(d) detecting means for detecting that either of said exposure control means or said gain control means is manually operated; and
(e) holding means for holding the operation state of either of the exposure control means or said gain control means which is not detected to be manually operated.

26. An image pick-up apparatus according to claim 25, wherein said exposure control means includes an aperture stop.

27. An image pick-up apparatus according to claim 3, wherein said control means controls the operation of said exposure control means according to the output of said image sensing means.

28. An image pick-up apparatus according to claim 4, wherein said gain control means includes a variable gain amplifier.

29. An image pick-up apparatus according to claim 25, wherein said holding means includes memory means for memorizing the operation state of the means which is not detected to be manually operated by the detecting means.

30. An image pick-up apparatus according to claim 29, wherein said memory means includes a capacitor.

31. An image pick-up apparatus according to claim 29, wherein said memory means includes a semiconductor memory.

* * * * *